(12) United States Patent
Holmes

(10) Patent No.: US 10,704,632 B2
(45) Date of Patent: Jul. 7, 2020

(54) TRANSMISSION CLUTCH ASSEMBLY

(71) Applicant: GM GLOBAL TECHNOLOGY OPERATIONS LLC, Detroit, MI (US)

(72) Inventor: Alan G. Holmes, Clarkston, MI (US)

(73) Assignee: GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 16/137,605

(22) Filed: Sep. 21, 2018

(65) Prior Publication Data
US 2020/0096069 A1 Mar. 26, 2020

(51) Int. Cl.
| | |
|---|---|
| F16D 67/02 | (2006.01) |
| F16H 57/10 | (2006.01) |
| F16D 49/08 | (2006.01) |
| F16D 121/28 | (2012.01) |
| F16H 1/28 | (2006.01) |
| F16D 121/32 | (2012.01) |
| F16H 57/08 | (2006.01) |
| F16D 65/06 | (2006.01) |

(52) U.S. Cl.
CPC ............. *F16D 67/02* (2013.01); *F16D 49/08* (2013.01); *F16H 57/10* (2013.01); *F16D 65/067* (2013.01); *F16D 2121/28* (2013.01); *F16D 2121/32* (2013.01); *F16H 1/28* (2013.01); *F16H 2057/087* (2013.01)

(58) Field of Classification Search
None
See application file for complete search history.

(56) References Cited

U.S. PATENT DOCUMENTS

| | | | |
|---|---|---|---|
| 2005/0023086 A1* | 2/2005 | Szilagyi | F03G 7/065 188/67 |
| 2010/0137083 A1* | 6/2010 | Carlson | F16H 7/1218 474/110 |
| 2013/0175134 A1* | 7/2013 | Boyes | F16D 27/105 192/75 |
| 2015/0361539 A1* | 12/2015 | Heitzenrater | C23C 4/08 475/269 |

* cited by examiner

*Primary Examiner* — Timothy Hannon

(57) ABSTRACT

The present disclosure provides a transmission clutch assembly having a drum, a brake band, a smart material band and an electrical circuit. The brake band substantially encircles the drum and includes first and second ends, a high friction inner surface, and a low friction outer surface. The smart material band includes a beginning end and a terminating end wherein the beginning end of the smart material band is coupled to the second end of the brake band while the terminating end of the smart material band is coupled to the first end of the brake band. The electrical circuit transfers an electrical current to the smart material band. The smart material band contracts when the electrical current is applied to the smart material band thereby drawing the first and second ends of the brake band closer and contracting the brake hand against the drum to restrict drum movement.

10 Claims, 4 Drawing Sheets

TRANSMISSION CLUTCH ASSEMBLY

TECHNICAL FIELD

The present disclosure relates to a clutch assembly for a transmission.

BACKGROUND

Automatic transmissions contain many gears in various combinations. This may be accomplished via planetary gear sets. The basic planetary gear set consists of a sun gear, a ring gear and two or more planet gears, all remaining in constant mesh. The planet gears are connected to each other through a common carrier which allows the gears to spin on shafts called "pinions" which are attached to the carrier.

One example of a way that this system can be used is by connecting the ring gear to the input shaft coming from the engine, connecting the planet carrier to the output shaft, and locking the sun gear so that it can't move. In this scenario, when we turn the ring gear, the planets will "walk" along the sun gear (which is held stationary) causing the planet carrier to turn the output shaft in the same direction as the input shaft but at a slower speed causing gear reduction (similar to a car in first gear). If we unlock the sun gear and lock any two elements together, this will cause all three elements to turn at the same speed so that the output shaft will turn at the same rate of speed as the input shaft. This is like a car that is in third or high gear. Another way that we can use a Planetary gear set is by locking the planet carrier from moving, then applying power to the ring gear which will cause the sun gear to turn in the opposite direction giving us reverse gear.

Referring now to FIG. 1A, the input shaft 130 for a traditional clutch assembly may be connected to the ring gear 132 while the output shaft 134 is connected to the planet carrier 136 which is also connected to a "multi-disk" clutch pack. The sun gear 138 is connected to a drum 140 which is also connected to the other half of the clutch pack. Surrounding the outside of the drum 140 is a band 112 that can be tightened around the drum 140 (via a servo 142 and an anchor pins 144 disposed in elongated recesses) to prevent the drum 140 with the attached sun gear 138 from turning. It is understood that the servo 142 is controlled by hydraulic pressure. However, the servo 142 and anchor pins 144 for the band 112 take up valuable packaging space in this region of the vehicle. However, it is rather challenging to mount the servo 142 and anchor pins 144 proximate to the drum due to limited vehicle packaging space. Therefore, a robust yet compact clutch assembly is needed.

SUMMARY

The present disclosure provides a compact clutch assembly for an automatic transmission which requires less packaging space relative to a traditional clutch assembly which implements a servo and piston. In a first embodiment of the present disclosure, the clutch assembly includes a drum, a brake band, a smart material band and an electrical circuit. The brake band substantially encircles the drum. The brake band includes a high friction inner surface, a low friction outer surface, a first end and a second end. The smart material band includes a beginning end and a terminating end wherein the beginning end of the smart material band is coupled to the second end of the brake band while the terminating end of the smart material band is coupled to the first end of the brake band. The electrical circuit may be configured to transfer an electrical current to the smart material band. The smart material band is configured to react when the electrical current is applied to the smart material band so that the smart material band may be used to draw the first and second ends of the brake band closer together and contract the brake band against the drum to restrict rotational movement of the drum. The smart material band may be a wire. Alternatively, the smart material band may define a smart material width which is less than a brake band width. The smart material width may therefore be large enough such that the smart material band may be a band (not a wire).

It is understood that in the foregoing example non-limiting embodiment, a first pin and a second pin may be further included in the clutch assembly. The first pin may be configured to mechanically and electrically couple the beginning end of the smart material band to the second end of the brake band while the second pin is configured to mechanically and electrically couple the terminating end of the smart material band to the first end of the brake band. The beginning and terminating ends of the smart material band are also in electrical communication with the electrical circuit. The smart material band may be electrically insulated from the brake band by an electrically insulating material on the surface of the brake band. Moreover, the first and the second pins may each optionally define slots configured to receive and retain an end portion of each of the smart material band and the brake band.

With respect to the foregoing example embodiment, the drum may optionally be a clutch brake drum. The clutch brake drum may be configured to at least partially house a clutch pack, an output shaft, and a plurality of gears. The plurality of gears may, but not necessarily, be a sun gear and at least one planet gear. Nonetheless, an output shaft may be coupled to an input shaft via the aforementioned plurality of gears.

In yet another embodiment of the present disclosure, a clutch assembly for a transmission is provided which includes a housing, a first smart material wire, a second smart material wire, and a rotational member which is configured to rotate about a shaft within the housing. The first smart, material wire may be affixed to a first side of the housing while the second smart material wire may be affixed to a second side of the housing. The second side of the housing is disposed opposite from the first side of the housing. Each of the first and second smart material wires include a housing end and an anchor end. The anchor end for each of the first and second smart material wires is affixed to the rotation member. However, the housing end of the first smart material wire is affixed to the first side of the housing while the housing end of the second smart material wire is affixed to the second side of the housing. It is understood that each of the first and second smart material wires are in communication with an electrical circuit.

The first smart material wire of the foregoing embodiment is configured to contract when the electrical circuit applies a current to the first smart material wire, and the second smart material wire is configured to contract when the electrical circuit applies a current to the second smart material wire. Accordingly, the rotational member is configured to rotate about the shaft in a first direction when the first smart material wire contracts. Similarly, the rotational member is configured to rotate about the shaft in a second direction when the second smart material wire contracts. The foregoing clutch assembly may be a ball ramp clutch assembly wherein the rotational member is a ball-ramp structure. However, the foregoing clutch assembly may also be a one-way selectable clutch assembly wherein the rotational member is a window plate disposed between a pocket plate and a strut plate.

The present disclosure and its particular features/advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
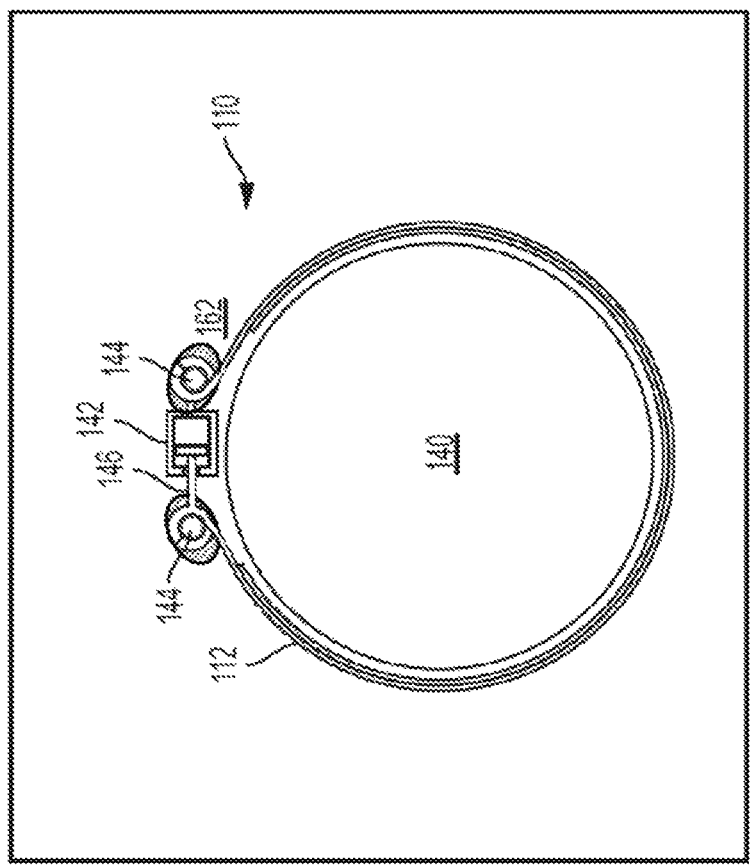
FIG. 1A is a schematic sectional view of a conventional planetary two speed mechanism including a band brake and a multi-plate clutch.
Figure 1B:
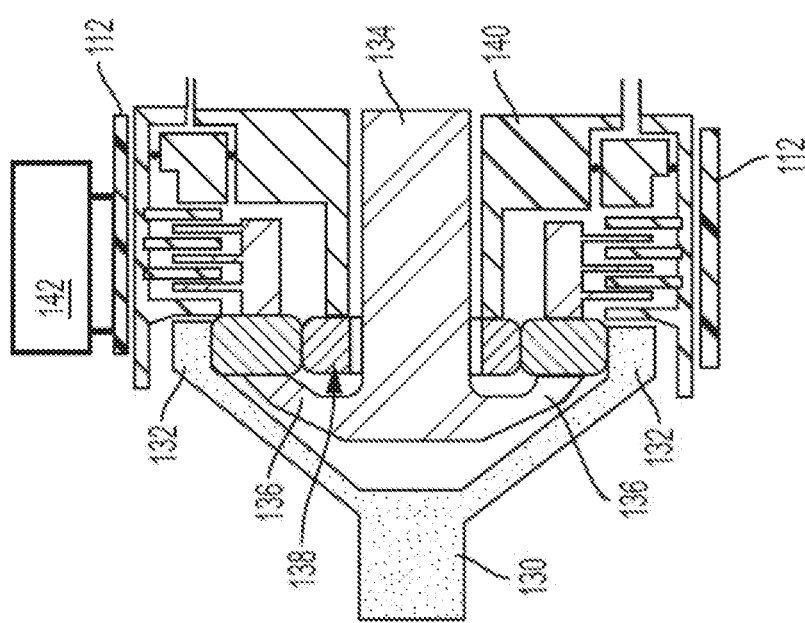
FIG. 1B is a schematic front view across the axis of a conventional band brake.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art, to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a clutch assembly 10 for an automatic transmission. The clutch assembly 10 includes a drum 12, a brake band 14, a smart material band 24 and an electrical circuit 27. The brake band 14 substantially encircles the drum 12. The brake band 14 includes a high friction inner surface 16, a low friction outer surface 18, a first end 20 and a second end 22. The smart material band 24 includes a beginning end 28 and a terminating end 26 wherein the beginning end 28 of the smart material band 24 is coupled to the second end 22 of the brake band 14 while the terminating end 26 of the smart material band 24 is coupled to the first end 20 of the brake band 14. The electrical circuit 27 may be configured to transfer an electrical current to the smart material band 24. The smart material band 24 is configured to react when the electrical current is applied to the smart material band 24 to change the distance between the first and second ends 22 of the brake band 14 and the engagement of the brake band 14 against the drum 12 to restrict rotational movement of the drum 12. If the smart material band 24 contracts when the electric current is applied then it will draw the first and second ends 22 of the brake band 14 closer together and contract the brake band 14 against the drum 12 to restrict rotational movement of the drum 12. Alternately, if the smart material band 24 expands when the electric current is applied then it will release the first and second ends 22 of the brake band 14 to move further apart and the brake band 14 to expand away from the drum 12 to allow rotational movement of the drum 12. The smart material band 24 may be a wire 34. Alternatively, the smart material band 24 may have a width may define a smart material width 36 which is less than a brake band width 38 of the brake band 14. The smart material width 36 may therefore be large enough such that the smart material band 24 may be a band (not a wire 34). With respect to all embodiments in the present disclosure, the various smart material wires/bands may be formed from any one or more of a variety of materials which includes but is not limited to a piezoelectric material, shape memory alloy, magnetostrictive material, or shape memory polymer.

Figure 2:
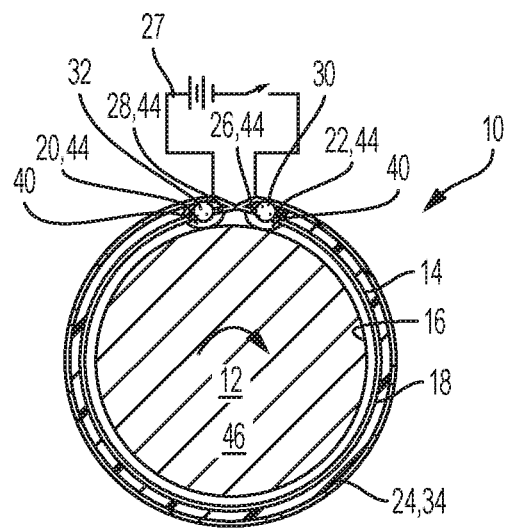
FIG. 2 a schematic front view of a transmission clutch drum and a smart material brake band according to the present disclosure.
Figure 3:
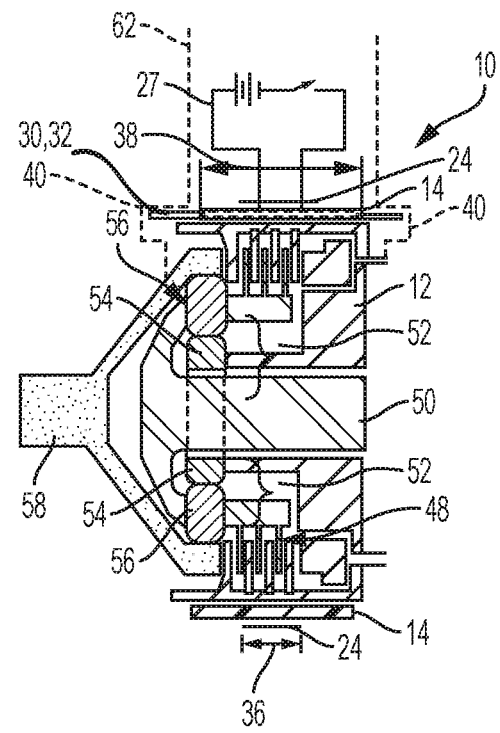
FIG. 3 is a schematic sectional view of a planetary two speed mechanism including a smart material band brake according to an embodiment of the present disclosure.
Figure 4:
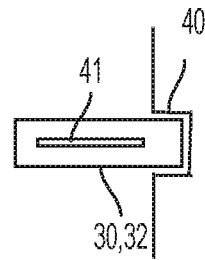
FIG. 4 is a side view of a first pin or a second pin at least partially disposed in a housing slot.

It is understood that in the foregoing example non-limiting embodiment, a first pin 30 and a second pin 32 may be further included in the clutch assembly 10. The first pin 30 may be configured to mechanically and electrically couple the beginning end 28 of the smart material band 24 to the second end 22 of the brake band 14 while the second pin 32 is configured to mechanically and electrically couple the terminating end 26 of the smart material band 24 to the first end 20 of the brake band 14. Each of the first and second pins 30, 32 are configured to slide within corresponding first and second (elongated) recesses 40 defined in the housing. See FIGS. 2-4. It is also understood that the beginning and terminating ends (28 and 26 respectively) of the smart material band 24 (or wire) are also in electrical communication with the electrical circuit 27. Moreover, as shown in FIG. 4, the first and the second pins 30, 32 may each optionally define at least one opening 41 configured to receive and retain an end portion 44 of each of the smart material band 24 and the brake band 14.

With respect to the foregoing example embodiment, the drum 12 may optionally be a clutch brake drum 46. The clutch brake drum 12 may be configured to at least partially house a clutch pack 48, an output shaft 50, and a plurality of gears 52 as shown in FIG. 3. The plurality of gears 52 may, but not necessarily, be a sun gear 54 and at least one planet gear 56. Nonetheless, as shown in FIG. 3, an output shaft 50 may be coupled to an input shaft 58 via the aforementioned gears 52.

Figure 5:
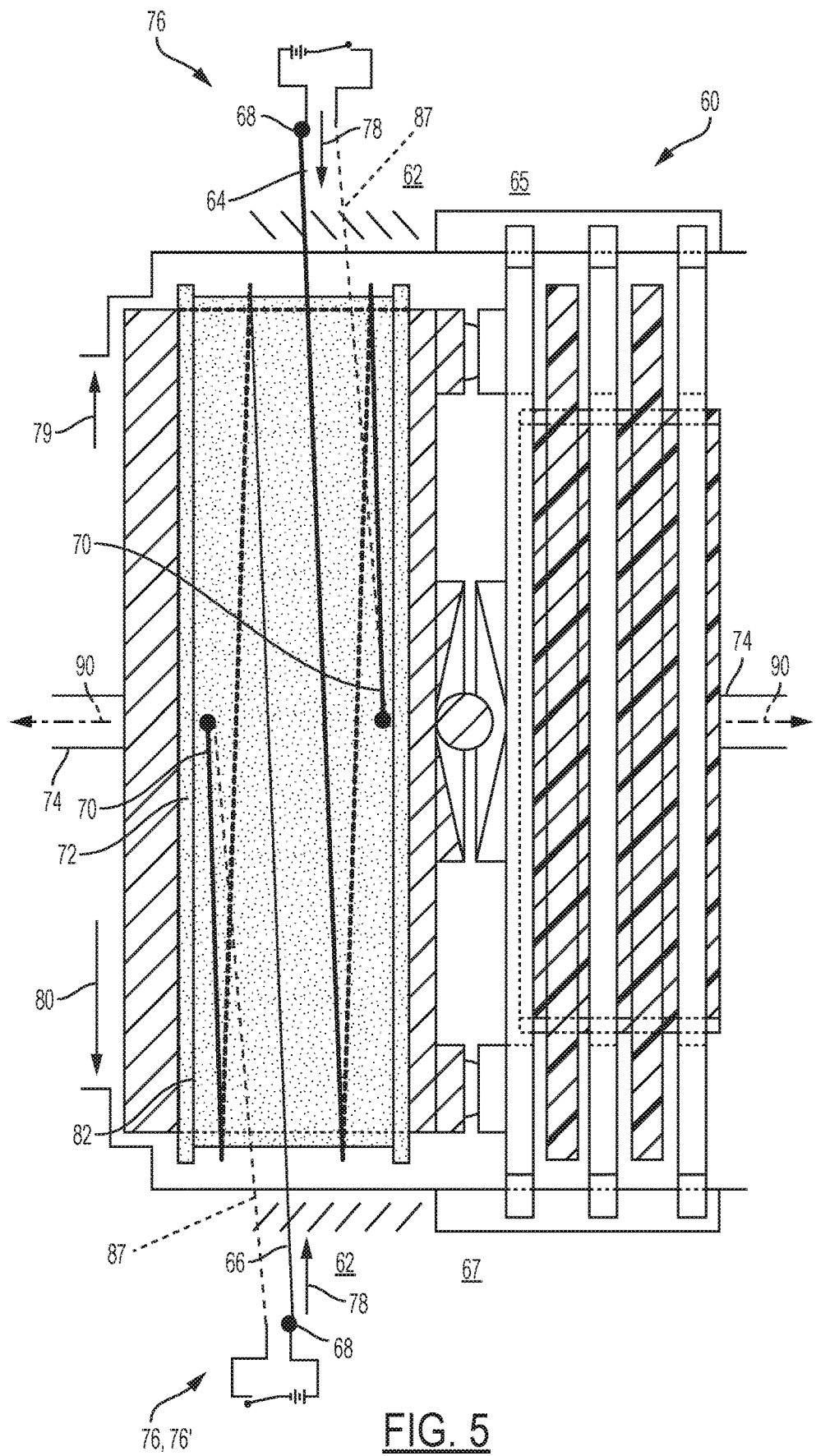
FIG. 5 is a side schematic view of a ball-ramp clutch assembly according to an embodiment of the present disclosure.

Referring now to FIG. 5, a ball ramp clutch is shown which also implements a smart material actuator. The smart material actuator includes a first smart material wire 64 in communication with a first circuit 76 and a second smart material wire 66 in communication with at least one of the first circuit 76 or a second circuit 76'. Each of the first and second smart material wires 64, 66 include a housing end 68 and an anchor end 70 wherein the housing end 68 is affixed to the housing 62 while the anchor end 70 is affixed to an outer circumferential surface of the ball-ramp structure 82. As shown, anchor ends 70 for each of the smart material wires 64, 66 are each also in electrical communication to a corresponding electric circuit 76, 76' via a (flexible) wire 87 thereby closing the circuit. It is understood that the housing end 68 of the first smart material wire 64 is affixed to a first side 65 of the housing 62 while the housing end 68 of the second smart material wire 66 is affixed to a second side 67 of the housing 62 wherein the second side 67 of the housing 62 is directly opposite the first side 65 of the housing 62. Accordingly, when an electric current 78 is applied to the first smart material wire 64, the first smart material wire 64 will react causing the ball-ramp structure 82 to rotate about axis 90 in a first direction. For example, if the smart material expands when current is applied to the smart material wire 64 (or band), rotational movement of the ball-ramp structure 82 occurs in a second direction 80 toward the second side 67 of the housing 62. However, if the smart material wire 64 contracts as current 87 is applied to the smart material wire 64 then rotational movement of the ball ramp structure 82 will occur in a first direction 79 toward the first side 65 of the housing 62. Similarly, with respect to the second smart material wire 66 (or band), when an electric current 78 is applied to the second smart material wire 66 (or band), the second smart material wire 66 (or band) will react causing the ball-ramp structure 82 to rotate about axis 90 in a second direction. For example, if the smart material expands when current is applied to the smart material wire 66 (or band), rotational movement of the ball-ramp structure 82 occurs in a first direction 79 toward the first side 65 of the housing 62. However, if the smart material wire 64 (or band) contracts as current 78 is applied to the smart material wire 64 (or band), then rotational movement of the ball ramp structure 82 will occur in a second direction 80 toward the second side 67 of the housing 62. When the ball-ramp structure 82 rotates, the rotation causes the ball to exert a linear force 69 (in the direction of axis 90) toward the second side 67 (clutch plate 67).

Figure 6:
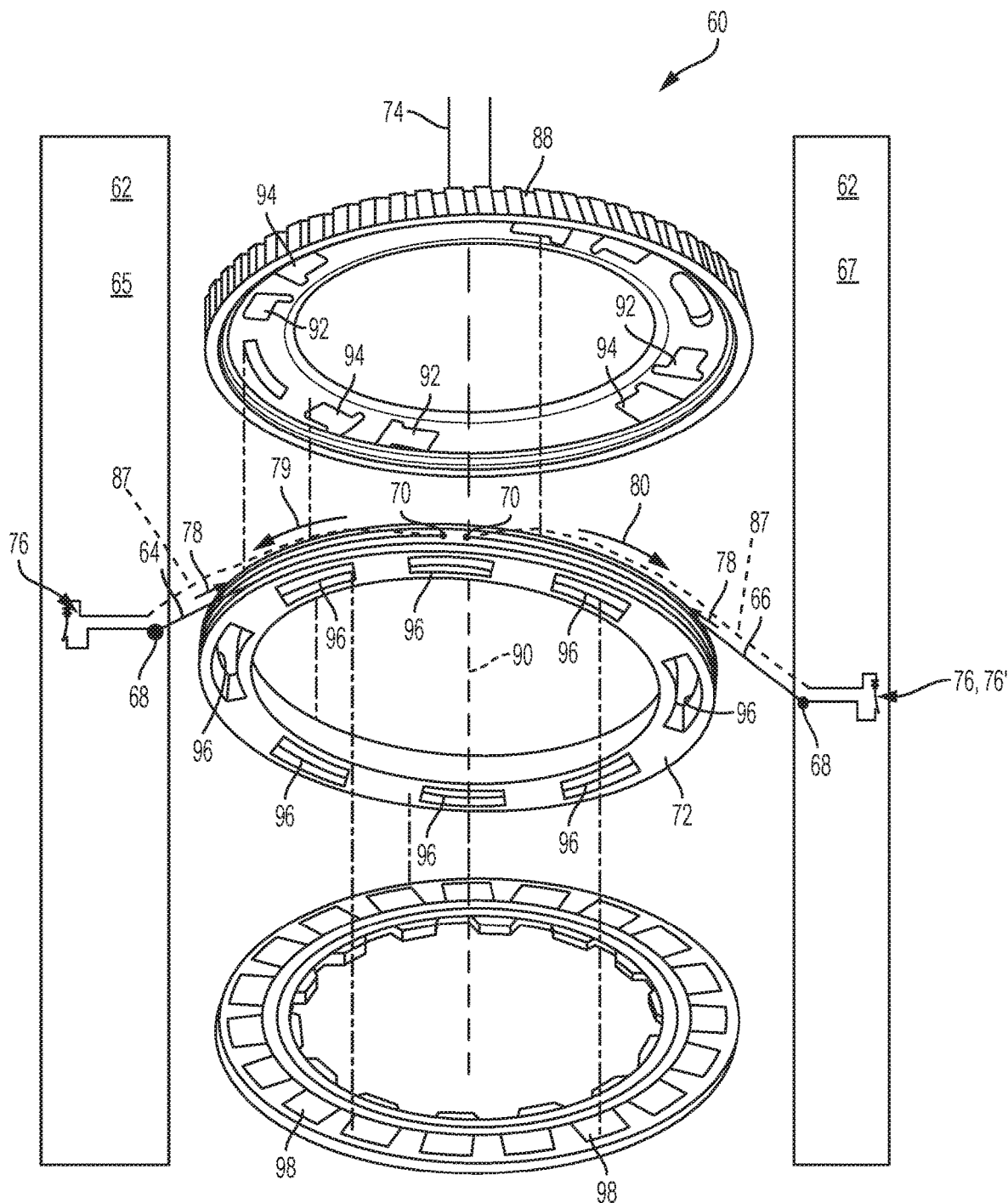
FIG. 6 is an expanded view of a selectable one-way clutch which implements a smart material wire in accordance with an embodiment of the present disclosure.

Referring now to FIG. 6, a selectable one-way clutch is shown which implements a smart material actuator. The smart material actuator includes a first smart material wire 64 and a second smart material wire 66. Each of the first and second smart material wires 64, 66 include a housing end 68 and an anchor end 70 wherein the housing end 68 is affixed to the housing 62 while the anchor end 70 is affixed to an outer circumferential surface of the window plate 84. As shown, anchor ends 70 for each of the smart material wires 64, 66 are each also in electrical communication to a corresponding electric circuit 76, 76' via a (flexible) wire 87 thereby closing the circuit. It is understood that the housing end 68 of the first smart material wire 64 is affixed to a first side 65 of the housing 62 while the housing end 68 of the second smart material wire 66 is affixed to a second side 67 of the housing 62 wherein the second side 67 of the housing 62 is directly opposite the first side 65 of the housing 62. Accordingly, when an electric current 78 is applied to the first smart material wire 64, the first smart material wire 64 will react causing the window plate 84 to rotate about axis 90 so as to engage at least one first spring-loaded strut 92 or 94 in the strut plate 88 through an aperture in the window plate 84 and into a recess in the pocket plate 86. Similarly, when an electric current 78 is applied to the second smart material wire 66, the second smart material wire 66 will react causing the window plate 84 to rotate about axis 90 so as to engage at least one second spring-loaded strut 94 or 92 [reference 92 or 94 accordingly in notes] in the strut plate 88 through an aperture in the window plate 84 and into a recess in the pocket plate 86. For example, if the smart material wire 64 (or band) expands when current is applied to the smart material wire 64 (or band), rotational movement of the ball-ramp structure 82 occurs in a second direction 80 toward the second side 67 of the housing 62. However, if the smart material wire 64 (or band) contracts as current 87 is applied to the smart material wire 64, then rotational movement of the ball ramp structure 82 will occur in a first direction 79 toward the first side 65 of the housing 62. Similarly, with respect to the second smart material wire 66 (or band), when an electric current 78 is applied to the second smart material wire 66 (or band), the second smart material wire 66 (or band) will react causing the ball-ramp structure 82 to rotate about axis 90 in a second direction. For example, if the second smart material wire 66 (or band) expands when current 78 is applied to the smart material wire 66 (or band), rotational movement of the ball-ramp structure 82 occurs in a first direction 79 toward the first side 65 of the housing 62. However, if the smart material wire 64 (or band) contracts as current 78 is applied to the smart material wire 64 (or band), then rotational movement of the ball ramp structure 82 will occur in a second direction 80 toward the second side 67 of the housing 62. It is understood that the first and second struts 92, 94 are each mirror configurations of the other so as to direct the rotational movement of the pocket plate 86 in a specific direction (first direction 79 or second direction 80) once either one of the first strut(s) 92 or the second strut(s) 94 are engaged with the pocket plate 86 through the aperture(s) of the window plate 84.

Therefore, with respect to the clutch assemblies shown in FIGS. 5 and 6, a clutch assembly 60 for a vehicle transmission includes a housing 62, first and second smart material wires 64, 66 (or bands), and a rotational member 72. The rotational member 72 may be a window plate 84 as previously described and shown in the selectable one-way clutch assembly 91 FIG. 6 or a ball-ramp structure 82 as previously described and shown as the ball ramp clutch assembly 93 in FIG. 5. The first smart material wire 64 may be affixed to a first side 65 of the housing 62 while the second smart material wire 66 may be affixed to a second side 67 of the housing 62 wherein the second side 67 of the housing 62 is disposed opposite from the first side 65 of the housing 62. Each of the first and second smart material wires 64, 66 include a housing end 68 and an anchor end 70. It is also understood that the rotational member 72 (such as but not limited to a window plate 84 and/or a ball-ramp structure 82) rotates about a shaft 74 within the housing 62. The anchor end 70 for each of the first and second smart material wires 64, 66 may be affixed to the rotation member 72 while the housing end 68 of the first smart material wire 64 is affixed to the first side 65 of the housing 62 and the housing end 68 of the second smart material wire 66 is affixed to the second side 67 of the housing 62. Each of the first and second smart material wires 64, 66 are in communication with an electrical circuit 76. See FIGS. 5-6.

In the foregoing embodiment, the first smart material wire 64 is configured to react when the electrical circuit 76 applies a current 78 to the first smart material wire 64, and the second smart material wire 66 is configured to react when the electrical circuit 76 applies a current 78 to the second smart material wire 66. That is, the smart material wires 64, 66 may contract upon application of the electric current 78 and expand upon interruption of the electric current 78. Alternately, the smart material wires 64, 66 may contract upon interruption of the electric current 78 and expand upon application of the electric current 78. It is understood that a current 78 is applied to only one out of the two smart material wires at a time. Therefore, the rotational member 72 (is configured to rotate) and/or rotates about the shaft 74 in a first direction 79 when the first smart material wire 64 contracts. Similarly, the rotational member 72 (is configured to rotate) and/or rotates about the shaft 74 in a second direction 80 when the second smart material wire 66 contracts. The first and/or second smart material wires 64, 66 may or may not be wound about the rotational member 72 multiple times.

While at least one example non-limiting embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is understood that various changes can be made in the function and arrangement of elements without departing from the scope of the disclosure as set forth in the appended claims and the legal equivalents thereof.

What is claimed is:

1. A clutch assembly for an automatic transmission comprising:
    a drum;
    a brake band at least substantially encircling the drum, the brake band having a high friction inner surface, a low friction outer surface, a first end and a second end;
    a smart material band having a beginning end and a terminating end, the beginning end of the smart material band being coupled to the second end of the brake band while the terminating end of the smart material band being coupled to the first end of the brake band;
    an electrical circuit configured to transfer an electrical current to the smart material band;
    wherein the smart material band is configured to react when the electrical current is applied to the smart material band so as to change the distance between the first and second ends of the brake band and to change the engagement of the brake band against the drum to restrict rotational movement of the drum.

2. The clutch assembly as defined in claim 1 further comprising a first pin and a second pin in electrical communication with the electrical circuit wherein the first pin is configured to mechanically and electrically couple the beginning end of the smart material band to the second end of the brake band while the second pin is configured to mechanically and electrically couple the terminating end of the smart material band to the first end of the brake band.

3. The clutch assembly as defined in claim 2 wherein the smart material band is a wire.

4. The clutch assembly as defined in claim 3 wherein the first and the second pins each define slots configured to receive and retain an end portion of each of the smart material band and the brake band.

5. The clutch assembly as defined in claim 4 wherein the drum is a clutch brake drum.

6. The clutch assembly as defined in claim 5 wherein the clutch brake drum is configured to at least partially house a plurality of gears.

7. The clutch assembly as defined in claim 6 wherein the plurality of gears is a sun gear and at least one planet gear.

8. The clutch assembly as defined in claim 7 wherein the clutch brake drum is coupled to at least one of the plurality of gears.

9. The clutch assembly as defined in claim 2 wherein the smart material band defines a smart material width which is less than a brake band width of the brake band.

10. The clutch assembly as defined in claim 2 wherein the first and the second pins each define slots configured to receive and retain an end portion of each of the smart material band and the brake band.

* * * * *